United States Patent
Grainger et al.

[11] Patent Number: 5,888,028
[45] Date of Patent: Mar. 30, 1999

[54] TOOL HOLDER

[75] Inventors: Jacob S. Grainger, Sherborn, Mass.; Brian D. Felice, Coventry, R.I.

[73] Assignee: Alpha Grainger Mfg., Inc., Franklin, Mass.

[21] Appl. No.: 944,264

[22] Filed: Oct. 6, 1997

[51] Int. Cl.⁶ .................................................... B26D 1/00
[52] U.S. Cl. .................... 407/110; 407/102; 407/107; 407/109; 407/111
[58] Field of Search .................... 407/102, 107, 407/109, 110, 111

[56] References Cited

U.S. PATENT DOCUMENTS

| | | | |
|---|---|---|---|
| 3,626,456 | 12/1971 | Freeborn | 82/12 |
| 3,655,969 | 4/1972 | Pollington et al. | 407/110 |
| 3,921,486 | 11/1975 | Valente | 84/420 |
| 3,958,809 | 5/1976 | Child | 279/1 L |
| 4,240,621 | 12/1980 | Daddato | 269/264 |
| 4,357,123 | 11/1982 | Zweekly | 407/110 |
| 4,452,106 | 6/1984 | Tartaglia | 84/43 |
| 4,630,944 | 12/1986 | Moehr | 384/39 |
| 4,655,424 | 4/1987 | Oshida | 248/73 |
| 4,754,671 | 7/1988 | Toffolon | 82/2.5 |
| 4,839,947 | 6/1989 | Cohen et al. | 24/499 |
| 4,887,945 | 12/1989 | Pano | 407/110 |
| 4,890,549 | 1/1990 | Steiner et al. | 99/450 |
| 4,902,078 | 2/1990 | Judd | 312/7.2 |
| 4,928,937 | 5/1990 | Bernstein | 269/136 |
| 4,938,640 | 7/1990 | Pano | 407/110 |
| 5,094,436 | 3/1992 | Stephen, III | 269/153 |
| 5,104,088 | 4/1992 | Bakanowsky, III | 248/442.2 |
| 5,267,817 | 12/1993 | Englund | 407/110 |
| 5,361,463 | 11/1994 | Revis | 24/453 |
| 5,516,241 | 5/1996 | Plutschuck et al. | 407/110 |
| 5,743,680 | 4/1998 | Von Haas et al. | 407/110 |

Primary Examiner—Andrea L. Pitts
Assistant Examiner—Toan Le
Attorney, Agent, or Firm—Weingarten, Schurgin, Gagnebin & Hayes LLP

[57] ABSTRACT

A tool holder in which a clamping element is integral with the tool body and movable into clamping and unclamping positions by simple screw or other adjustment. In one embodiment the tool holder comprises an elongated metal body having a mounting portion adapted for attachment to a machine and a forward end operative to retain a cutting tool thereon. The forward end includes an elongated clamping element integral with the body and space therefrom to provide a recess into which a tool bit is insertable. A set screw or other actuating element is cooperative with a portion of the elongated element and the body to cause flecture of the web portion and movement of the elongated element toward the confronting surface of the body to clamp a tool bit into position.

7 Claims, 3 Drawing Sheets

TOOL HOLDER

CROSS REFERENCE TO RELATED APPLICATIONS

STATEMENT REGARDING FEDERALLY SPONSORED RESEARCH OR DEVELOPMENT

BACKGROUND OF THE INVENTION

This invention relates to tool holders and more particularly to a tool holder for retaining a cutting tool bit or similar item.

A variety of tool holders are known for holding cutting bits and the like for use in machine tools such as lathes and milling machines. The tool holders may take a variety of forms to suit the machine in which they are employed and to accommodate the particular cutting bit or other item to be clamped in the holder. In general the tool holders comprise a metal body having one or more separate clamping elements fastened to the body by appropriate machine screws or other fasteners and defining a recess or opening into which a tool bit is inserted and locked into position by one or more locking screws or other clamp elements.

The conventional tool holders having a body and one or more separate clamp elements and fasteners must be assembled for use and the individual parts must be separately fabricated. The various parts can become worn such that over time the separate parts do not fit together properly to maintain appropriate clamping forces on a tool bit. The multiple part tool holders of conventional design also suffer from misalignment of the parts which can prevent accurate retention of the tool bit. In addition, metal cuttings and other debris can work their way between the elements of the holder and interfere with appropriate clamping of the bit. It would therefore be advantageous to have an improved tool holder which overcomes these deficiencies.

BRIEF SUMMARY OF THE INVENTION

The invention provides a tool holder in which a clamping element is integral with the tool body and movable into clamping and unclamping positions by simple screw adjustment. The tool holder in one embodiment comprises an elongated metal body having a mounting portion adapted for attachment to a machine with which the tool holder is to be used, and a forward end operative to retain a cutting tool thereon. The forward end includes an elongated clamping element integral with the body and spaced from a surface of the body by an integral web portion. A first portion of the elongated element is spaced from a surface of the forward end of the body and is configured to retain a cutting bit therein. A second portion of the elongated element is spaced from a surface of the forward end of the body and one or more actuating elements are cooperative with the second portion of the elongated element and the body to cause flexure of the web portion and movement of the first portion toward the confronting surface of the body to clamp a tool bit disposed between the first portion and the body.

The body of the tool holder can be configured in a variety of shapes and sizes to suit particular machine and operational requirements. In alternative embodiments, more than one integral clamping element can be provided to retain bits of various configurations.

BRIEF DESCRIPTION OF THE SEVERAL VIEWS OF THE DRAWING

The invention will be more fully described in the following detailed description taken in conjunction with the drawing in which.

DETAILED DESCRIPTION OF THE INVENTION

Figure 6:
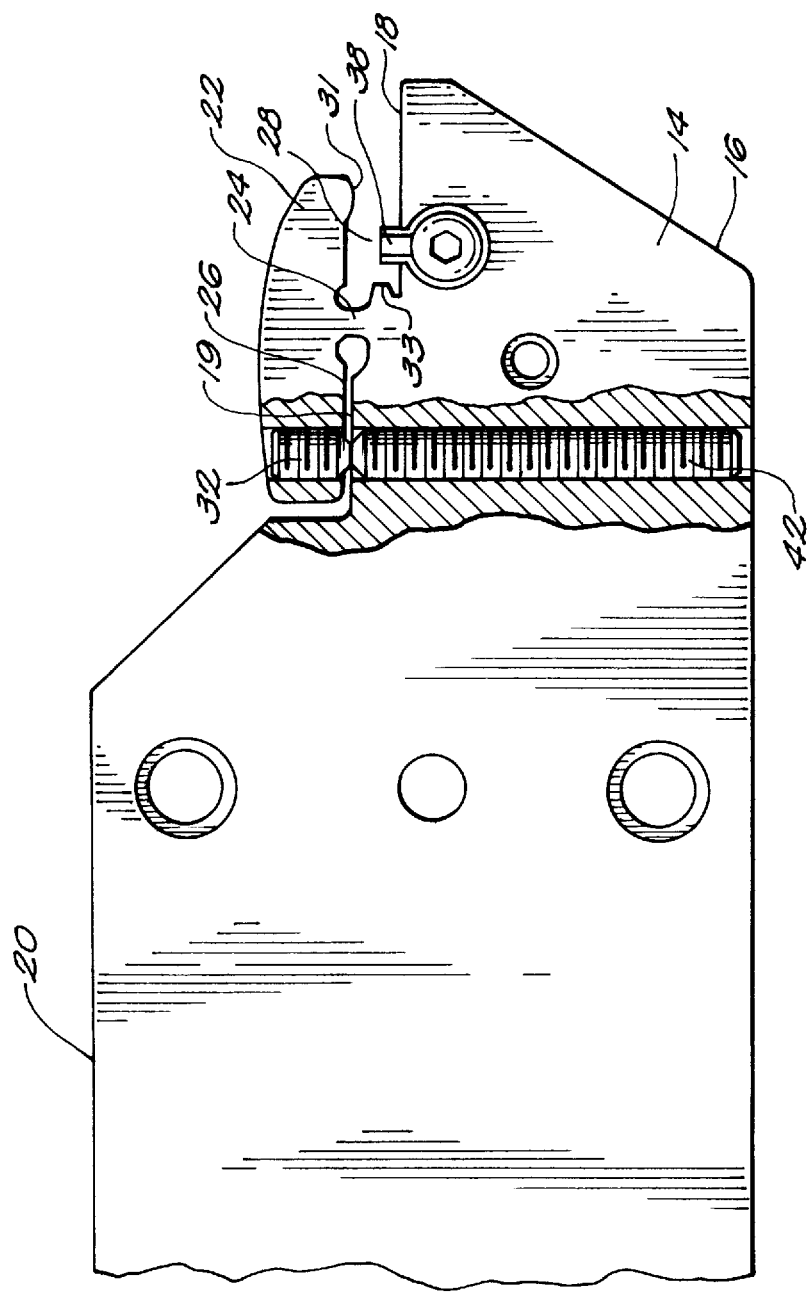
FIG. 6 is an partially sectioned elevation view of the tool holder without the bit in place.

A preferred embodiment of the invention is shown in the drawing and includes a body 10, typically fabricated of steel, having a rectangular cross-section, a mounting portion 12 and a forward end portion 14. In the illustrated embodiment, the forward end portion has a downwardly sloping forward surface 16 and surfaces 18 and 19 which are disposed below a top surface 20 of the body. An elongated clamping element 22 is joined to the forward end portion of the body by an integral web 24 which extends between the bottom surface of the clamping element 22 and the surfaces 18 and 19 of the forward end portion of the body. The bottom surfaces 26 of the clamping element are spaced from the confronting surfaces 18 and 19 of the end portion to define a forward recess 28 and a rearward recess 30. The web is joined to the body and to the clapping element by rounded areas as shown to avoid sharp corners and permit flexing of the web during locking engagement of the clapping element with the tool bit without undue strain being imposed on the web. A set screw 32 is threadably disposed in a threaded opening through the rearward section of clamping element 22. The inner end of the set screw can bear against the confronting surface of the body. A tool bit 34 is insertable into the space 28 and is clamped in position by tightening of the set screw 32. Tightening of the set screw causes flexure of the web 24 and movement of the forward portion of clamping element 22 toward the confronting surface of the front end portion of the body to provide clamping force to the cutting bit interposed between the confronting elements. The forward portion of the clamping element includes a ridge or nose 31 extending across the width of the element in which provides a bearing surface which engages the confronting surface of a tool bit as illustrated in FIG. 6. Upon tightening of the set screw 32, the forward portion of the clamping element is caused to move downward with the ridge 31 moved into engagement with the tool bit and with a relatively high clamping force being provided on the tool bit along the relatively narrow elongated baring surface of the ridge.

Figure 1:
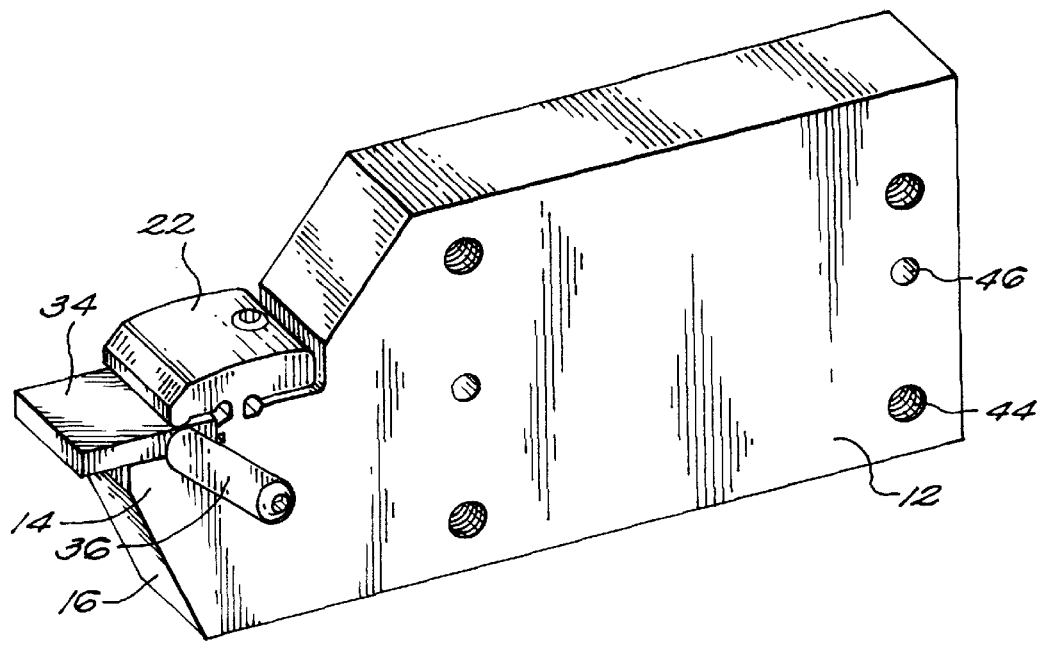
FIG. 1 is a pictorial view of an embodiment of the tool holder in accordance with the invention.
Figure 2:
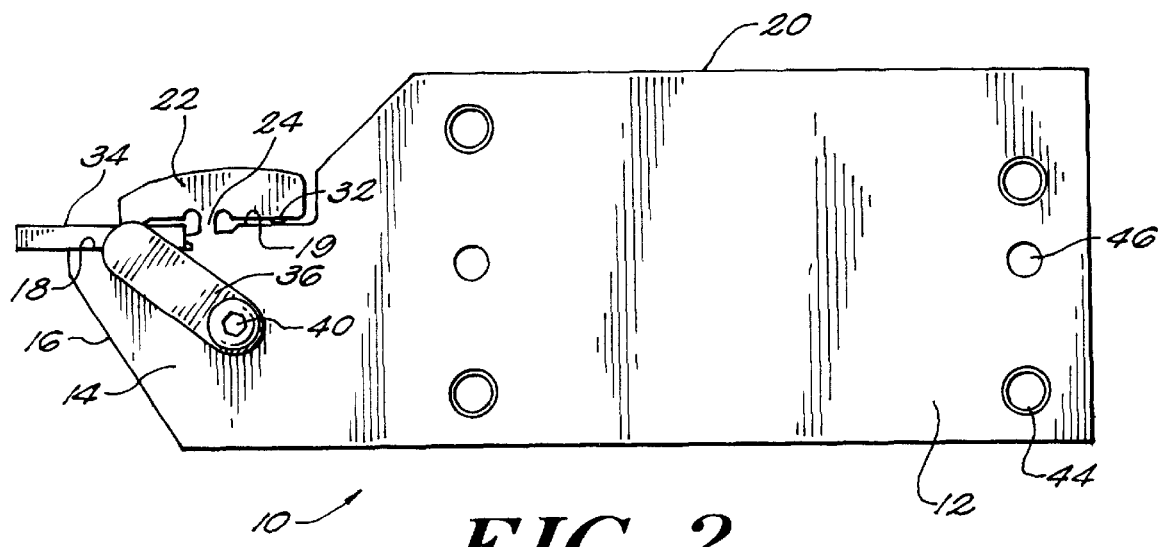
FIG. 2 is an elevation view of one side of the tool holder of FIG. 1.
Figure 3:
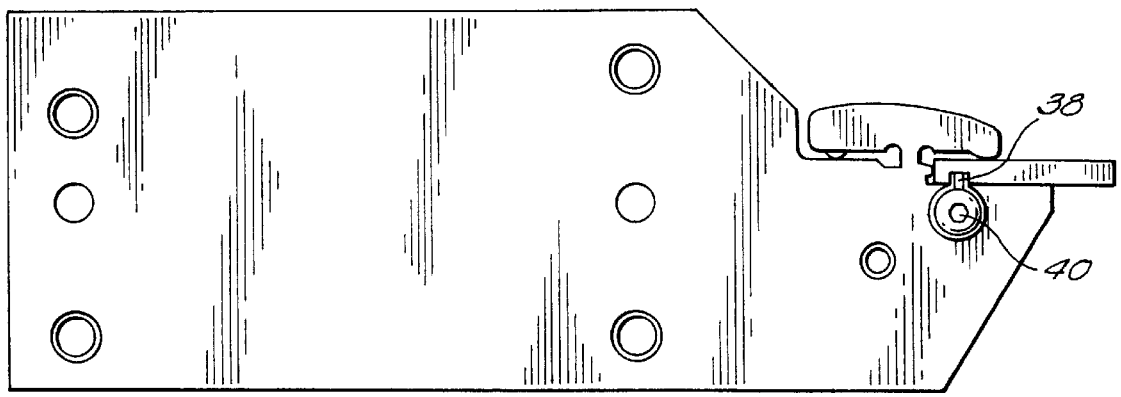
FIG. 3 is an elevation view of the opposite side of the tool holder of FIG. 1.
Figure 4:
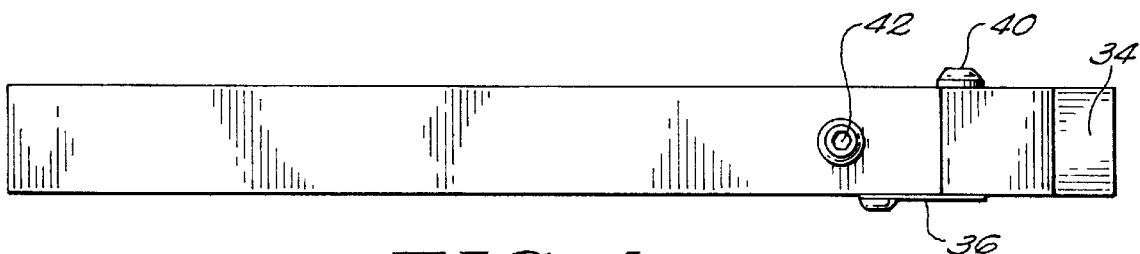
FIG. 4 is a bottom view of a portion of the tool holder of FIG. 1.
Figure 5:
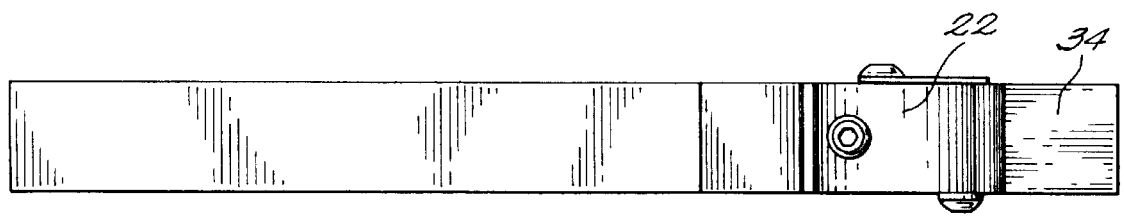
FIG. 5 is a top view of a portion of the tool holder of FIG. 1.

The inner end of the recess 28 has a ridge 33 extending across the width of the body in which serves a stop against which tool bit 34 is abutted when fully seated within the recess, as illustrating in FIG. 3. Debris which may be present in the vicinity of the tool holder will tend to be pushed away to the spaces above and below the ridge 31 as the tool bit is seated against the ridge such that the debris is less likely to interfere with proper seating of the tool bit. The tool bit is prevented from sideways movement in the tool holder by side elements 36 and 38, as illustrated. The element 36 is of sufficient length to serve as a spring to urge the tool bit against element 38 which is rigid and which serves as a side stop. The tolerances of the recess into which the tool bit is inserted are such that only a small movement of the clamping element is necessary to lock the tool bit into place within the holder. The spacing between the ridge 31 and confronting portion of the surface 18 is typically 0.002 inches greater than the thickness of the tool bit. Thus upon insertion of the tool bit into the recess 28 the clamping element can be locked in place by relatively smaller rotation of the set screw. With the set screw just touching the confronting surface of the body in an unlocked position of the clamping element, blocking engagement of the tool bit by the clamping element can be accomplished upon rotation of the set screw by less than one quarter turn.

A second set screw 42 can be provided within a threaded opening extending from the bottom surface of the body to the surface 19 to provide actuation of the integral clamping element from the bottom of the tool holder. Both set screws can be provided to permit clamping and unclamping of a tool bit by top access or bottom access to the tool holder. This alternative is particularly useful in situations where either the top or bottom of the holder may be inaccessible or of only limited access by its placement within a particular machine. In the illustrated embodiment the set screws 32 and 42 have disposed along a common access such that the confronting ends of the set screws abut one another. Alternatively the respective set screws can be in threaded opening which are not aligned along a common access such that each set screw will bare against a respective portion of the confronting surface of the body or clapping element.

The mounting section 12 of the tool holder in the illustrated embodiment has four threaded openings 44 and two non-threaded openings 46. The non-threaded openings are cooperative with positioning pins on an associated machine (not shown), and the threaded openings receive corresponding threaded fasteners for fastening the body to a mounting surface of an associated machine.

The mounting section 12 can be of any form and configuration to fit the machine with which it is employed. For example, the mounting section can be a square shank to fit into standard tool mounts.

The set screws in the illustrated embodiment are shown as hexhead Allen-style fasteners. Other threaded or non-threaded fasteners or other actuating elements can be provided to produce the clamping movement of the clamping element.

In addition to use as a tool holder, the invention can also be used as a clamping device to retain other elements in position in addition to cutting tool bits.

The invention is not to be limited to what has been particularly shown and described except as defined by the appended claims.

We claim:

1. A tool holder comprising:

a body having a forward end, a back end and a mounting portion adapted for retention on a machine;

the body further having a clamp section near the forward end, including an elongated clamping element integral with the body and spaced from a surface of the body by an integral web portion;

a first portion of the clamping element spaced from a surface of the body and extending from the web portion toward the forward end and defining a recess in which a tool bit can be disposed;

a second portion of the clamping element spaced from a surface of the body and extending from the web portion toward the back end;

an actuating element cooperative with the second portion of the clamping element and the body to cause flexure of the web portion and movement of the first portion of the clamping element toward the confronting surface of the body to clamp a tool bit disposed therebetween; and a pair of side retainers on respective sides of the recess to maintain the transverse disposition of a tool bit disposed in the recess.

2. The tool holder of claim 1 including a ridge extending across the width of the body at the inner end of the recess adjacent to the integral web portion and operative to provide an inner surface against which a tool bit disposed in the recess is seated.

3. The tool holder of claim 1 including a ridge extending across the width of the forward end of the clamping element and providing a bearing surface to engage a tool bit.

4. The tool holder of claim 1 wherein at least one of the side retainers includes a retaining element mounted to the body and having an end portion extending across at least a portion of the recess, and further comprising a fastener for securing the retaining element on the body.

5. The tool holder of claim 1 wherein one of the side retainers is rigid, and the other one of the side retainers is resilient and operative to urge a tool bit disposed in the recess against the rigid side retainer.

6. The tool holder of claim 1 wherein the body has one or more mounting elements in the mounting portion of the body and operative to mount the body to an associated machine.

7. The tool holder of claim 6 wherein the mounting elements include a plurality of mounting holes.

\* \* \* \* \*